United States Patent [19]
Stevens et al.

[11] Patent Number: 5,503,492
[45] Date of Patent: Apr. 2, 1996

[54] CLAMP FOR SECURING TUBULAR MEMBERS

[75] Inventors: William H. Y. Stevens, Madison; Robert E. Miller, Jr., Newark, both of N.J.

[73] Assignee: Robert E. Miller & Co., Inc., Newark, N.J.

[21] Appl. No.: 221,825

[22] Filed: Mar. 31, 1994

[51] Int. Cl.⁶ ............................... F16B 37/04; F16B 7/04
[52] U.S. Cl. .................. 403/297; 403/292; 411/182; 411/510; 411/913; 16/42 T; 248/188.9
[58] Field of Search ..................... 403/256, 260, 403/245, 264, 292, 297; 411/182, 508, 509, 510, 913; 16/42 T; 248/231.3, 316.2, 188.9

[56] References Cited

U.S. PATENT DOCUMENTS

| | | | |
|---|---|---|---|
| 1,580,781 | 4/1926 | Fitch | 16/42 T |
| 2,618,009 | 11/1952 | Tinnerman . | |
| 2,654,620 | 10/1953 | Tinnerman . | |
| 2,666,943 | 1/1954 | Kramcsak | 248/188.9 X |
| 2,807,042 | 9/1957 | Cramer | 16/42 T X |
| 3,320,846 | 5/1967 | Orain . | |
| 3,720,978 | 3/1973 | Miller et al. | 16/42 T |
| 3,742,552 | 7/1973 | Balchunas | 248/188.9 X |
| 3,864,051 | 2/1975 | Reid . | |
| 4,518,293 | 5/1985 | Pleickhardt et al. . | |
| 4,531,870 | 7/1985 | Moryl et al. . | |
| 4,604,014 | 8/1986 | Frano . | |
| 4,667,916 | 5/1987 | Richards | 403/260 X |
| 4,810,144 | 3/1989 | Martelli . | |
| 5,249,901 | 10/1993 | Moore | 411/182 |
| 5,267,806 | 12/1993 | Bock | 403/260 |

*Primary Examiner*—Anthony Knight
*Attorney, Agent, or Firm*—Gregory Friedlander

[57] ABSTRACT

A spring formed from strip steel crimped on a threaded bolt for receiving a threaded member preferably having four arms separated by 90 degrees to form a cross and wherein the ends of the legs are cambered in order to provide greater bearing surface against each of the two walls of a corner in a tubular member when the spring member is inserted into the tubular member. Where the arms extend from the well of the spring, the arms are slightly notched in order to provide for automatic indexing. When the spring is compressed the wells formed by the spring contact the walls of the tubular member.

24 Claims, 4 Drawing Sheets

CLAMP FOR SECURING TUBULAR MEMBERS

BACKGROUND OF THE INVENTION

This invention relates broadly to the art of connecting tubing.

More particularly the invention relates to metal members having a memory to a predetermined shape for use in square tubular furniture members for the purpose of connecting the same.

Several inventions are present for joining tubes. Moryl, U.S. Pat. No. 4,531,870 shows a four sided locking mechanism for use with square tubes.

Moryl describes an invention having a socket with a collar to provide for identical radial tabs off set by 90 degrees.

The ends of the radial tabs are fitted within a square hole (the right angle dihedon shape).

This four sided figure lies above a rounded portion and pins. When in place the sides which deform to hold the collar in place on the cylindrical socket.

The purpose of the four tabs in Moryl is different from the purpose of the tabs in the instant invention. The purpose of citing this prior art is that it visibly shows wings in a securing object which has some similarity in appearance to the wings disclosed in present invention.

The use of pins in Moryl is only shown because those pins do not function and are not defined in a similar fashion to the wings in the present invention.

Instead they are pointed out because they show how different techniques are used in prior art in order distinguish them from the technique in the present invention.

The invention alleviates the need for the use of the pins by having biting surfaces which greatly simplifies the invention. The present invention also uses arms for actual attachments as opposed to being for the purpose of 45 degree rotation.

Moryl shows the radial tabs designed to rotate within four longitudinal windows, which actually teaches away from the disclosed invention with this specification.

The design utilized for accomplishing the present invention which is present in the prior art utilizes a plurality of extending legs such as those shown in Martelli, U.S. Pat. No. 4,810,144.

Martelli shows a plurality of angular legs.

Also sharp edges of the legs are known which dig aggressively into the inner walls of the tube to resist withdraw.

Pleickhardt, U.S. Pat. No. 4,518,293 shows a tube connecter which incorporates the spaced segments referred to as legs as the cutting edge of at least some of the legs in order to help it resist turning motion. In addition, Pleickhardt describes a radial slit, which is presumably to allow the disk to absorb some of the compression when the disk is inserted.

U.S. Pat. Nos. 4,810,144 Martelli et al. shows a tube connector with springs 28 and 30. Also it shows square tubing 22A in FIG. 2.

U.S. Pat. Nos. 3,864,051 Reid et al. discloses a connector for square tubular member. Note the spherical radius of spring 7 in FIG. 3.

The Reid patent does not obtain a spherical radius, but instead defines a curved portion which, if sufficiently compressed, would join two edges of a space formed by section 7 & 8 in order to define a closed semicircular member.

The flats of the spring are not in the corners of the tubular member, however.

U.S. Pat. Nos. 2,618,009 Tinnerman; 2,654,620 Tinnerman; and 4,518,293 Pleickhardt show springs inside of a tube.

U.S. Pat. Nos. 3,320,846 Orain and 4,604,014 Frano show springs inside of a bore. None of these are similar prior art.

U.S. Pat. No. 4,531,870 Moryl et al. shows tabs in the corners of a square hole 2. The tabs are not of a spherical radius and do not relate directly to the invention disclosed herein as described in more detail below.

SUMMARY OF THE INVENTION

The present invention is designed to locate the spring portion of a spring plate stamped from spring steel in the corners of square tube rather then the sides of the square tube.

By accomplishing this a considerable gain in pull out and torque strength, when tightening the fastener is recognized. A much larger torque rating may be obtained.

In addition rotation is eliminated as a problem much more certainly since the extended arms cannot be made to move due to their intersection with corners of the tubing.

A spherical radius is formed at the top of the spring steel as opposed to a flat top for extra strength and improved flexing instead of a flat top shown in the prior art.

The ends of the legs (the tabs) are champhered to give an increased bite area and to more fully fit the intersecting area on the corners and to prevent the springs from penetrating the tube.

In addition, when tightened into place, the interior circumference (the area between the legs) flexes outward and contacts, and thereby reinforces, the tube walls. This serves as a tube support and adds strength to the tubing.

The arms are notched for automatic indexing in production.

Tubing is commonly used in the industry wherein a seam joins the two sides of the tubing formed from a flat piece of metal rolled into a square fashion.

Because the present invention does not contact the sides except when tightened, the device may be used in this type of tubing more effectively than the prior art.

It is therefore an object of the present invention to provide for a tube fastener which gives greater pull out and torque ratings.

A further object is to provide for a tube fastener which provides for re-enforcement of the side walls of a tube in which it sits.

A further object is to provide a tube fastener which is easily inserted but will not mar or disfigure the tube surface when highly torqued.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF THE DRAWINGS

For a further understanding of the nature and objects of the present invention, reference should be made to the following detailed description taken in conjunction with the accompanying drawings in which like parts are given like reference numerals and wherein.

DETAILED DISCUSSION OF THE PREFERRED EMBODIMENT(S)

Figure 1:
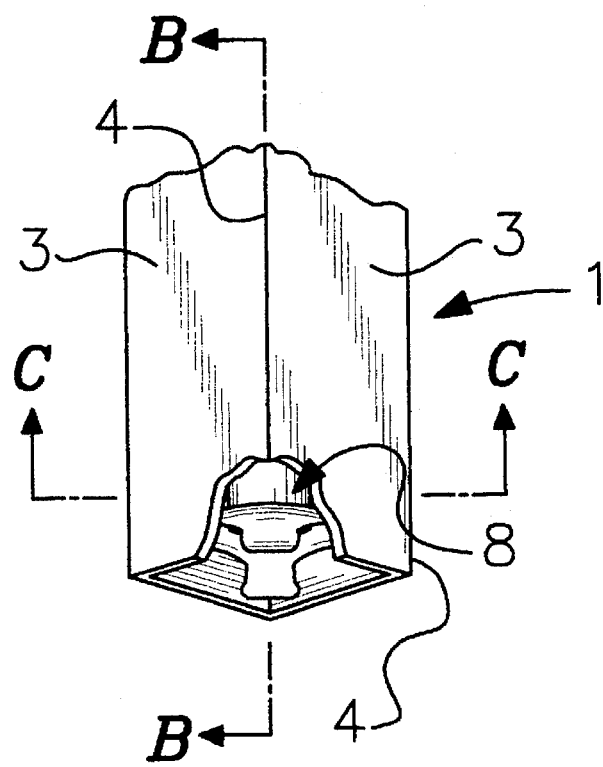
FIG. 1 is a perspective view of the preferred embodiment inserted within a square tubing.
Figure 2:
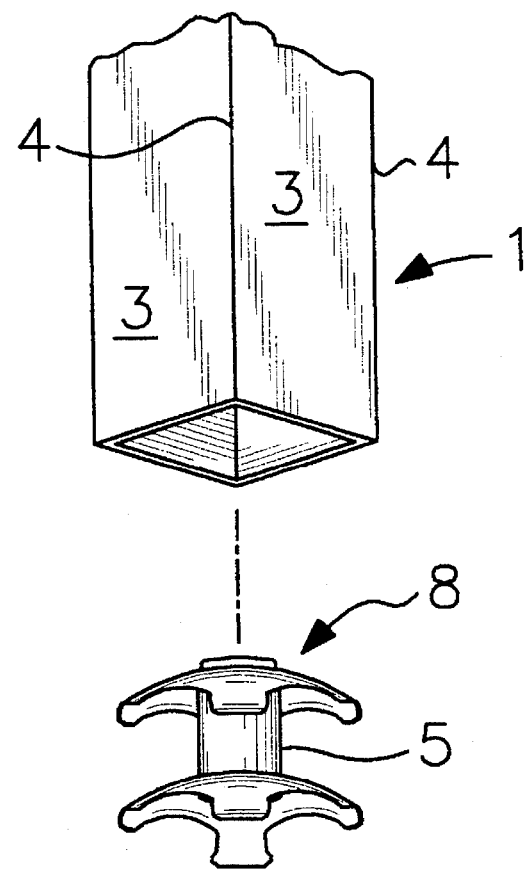
FIG. 2 is a perspective view of the preferred embodiment prior to insertion.
Figure 3:
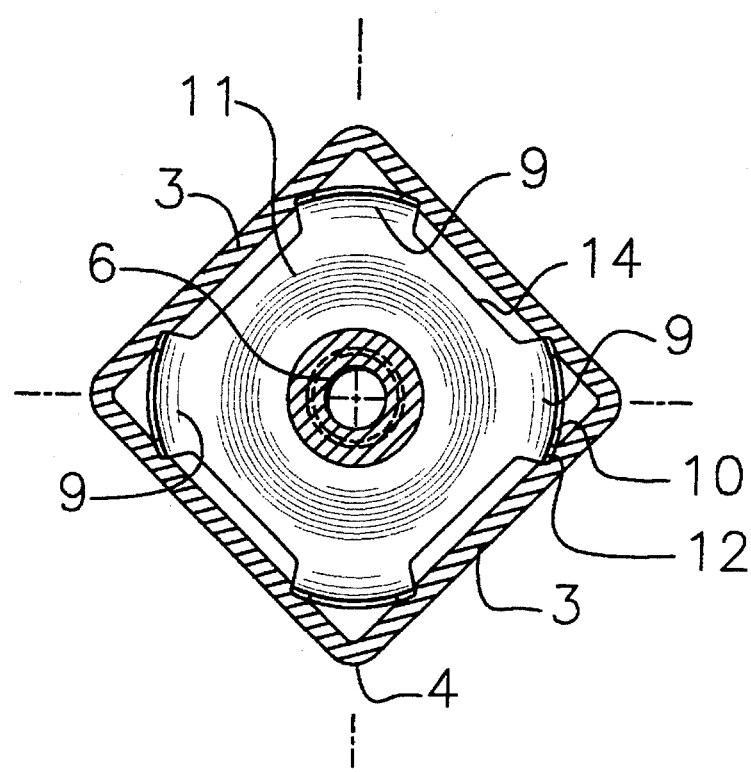
FIG. 3 is cross-sectional view of an alternate embodiment of FIG. 1 through the C—C axis without indexing.
Figure 4:
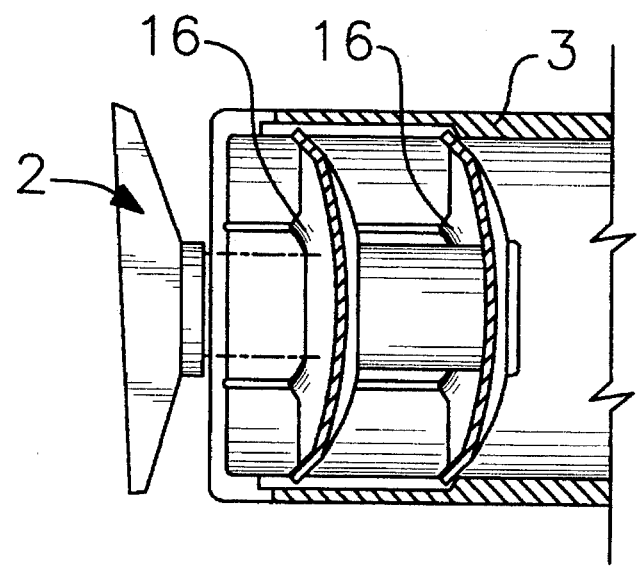
FIG. 4 is a cross-sectional view of the embodiment shown in FIG. 1 though the B—B axis.
Figure 5:
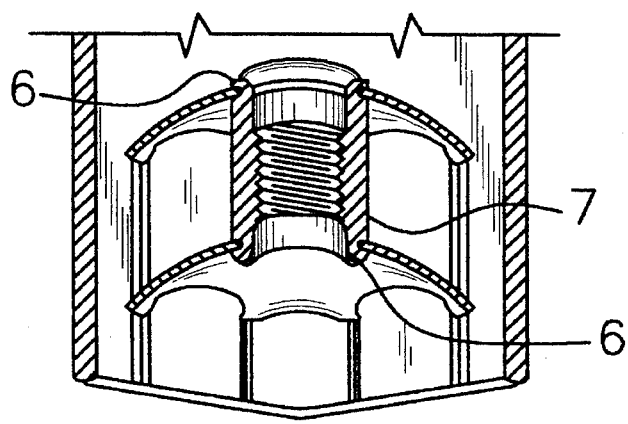
FIG. 5 is a cross-section of the embodiment shown in FIG. 1 through the A—A axis.

As can best be seen by reference to FIG. 1 the invention comprises an article of manufacture for joining a first tubular member 1 to a second member 2 (shown on FIG. 4 as a footing 2). The tubing is comprised of a set of four walls 3 which meet in four corners 4.

Figure 8:
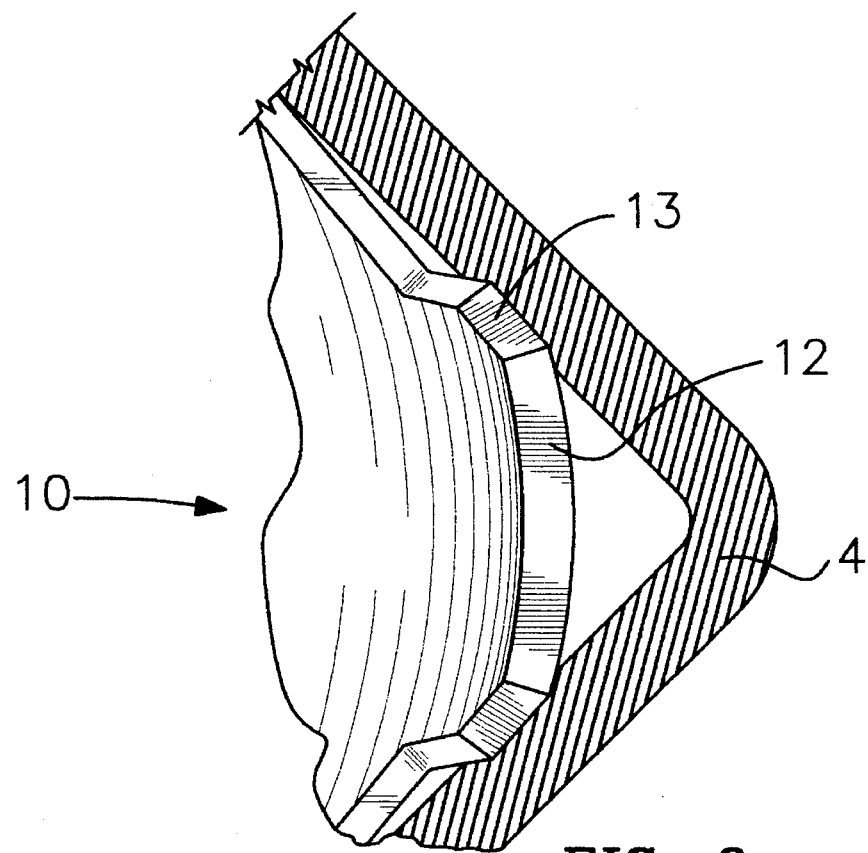
FIG. 8 is an enlarged view of the cutting faces of the bite areas with the spring of FIG. 1.

The invention itself is centered on a threaded cylinder or bushing 5. Attached by way of riveting the cylinder 5 at rivet points 6. Held apart by cylindrical portion or washer 7 are two spring steel stamped metal springs 8. Each of these springs 8 comprises a curved disk of steel 11 terminating in four arms 9 of spring steel. Each of these arms 9 terminate, as best seen in FIG. 8, in an engaging means 10. Engaging means 10 is preferably a sharp edge 12. This edge 12 may be increased in size so as to have a greater cutting surface by cutting on either side of the edge to form bite areas or flats 13 on the face of the edge 12.

As can be seen of FIG. 8, these bite areas or flats 13 are designed so that when the spring is in place within the tube, an enlarged surface area described as the flats 13 is presented against the walls 3 to cut into the side walls 3. This contact between the flats 13 and walls 3 occurs close to corners 4.

Figure 6:
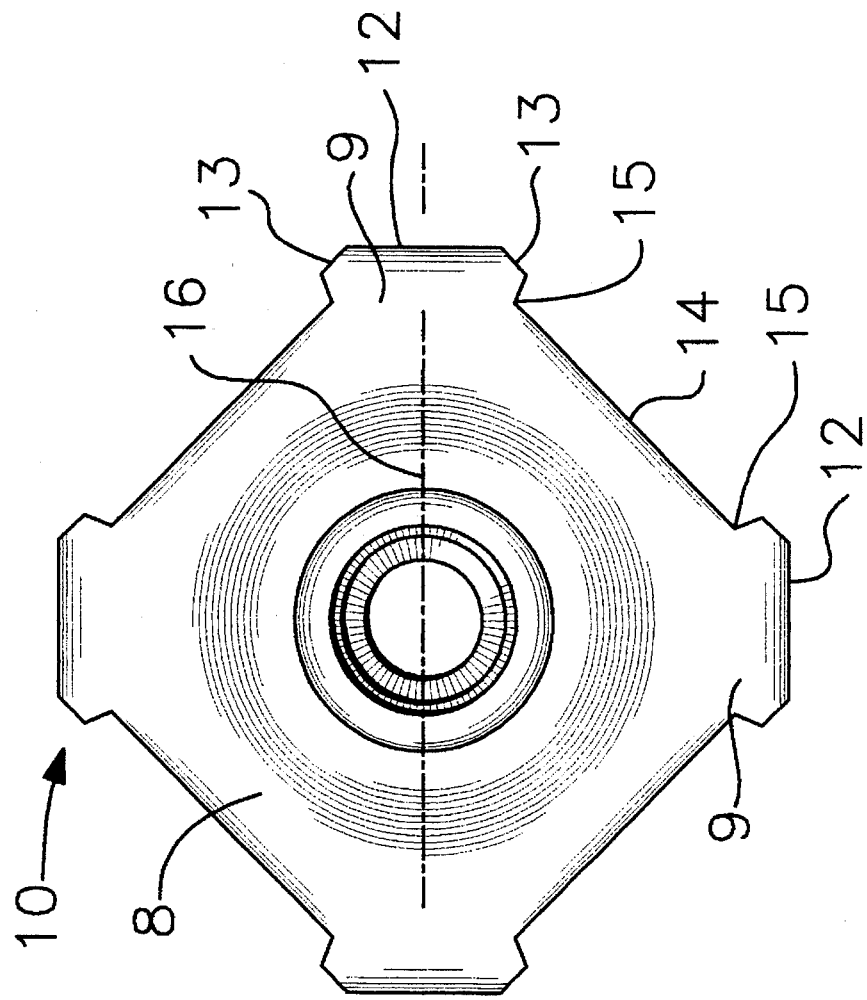
FIG. 6 is a top view of the spring plate of FIG. 1 with indexing.

As shown on FIG. 6 the invention further comprises notched areas 15 designed for automatic indexing. This is accomplished by a notch 15 located where the spring 8 expands outward to form the edge 12. Indexing is accomplished during insertions by fitting the spring so that pins on an indexing piece of equipment fit within the notches 15 on either side of the arm 9 to hold the arm 9 in position.

The invention spring 8 has a furrow 14 between the arms 9 so that when the spring is flexed, a contact area of the furrow 14 between the arms 9 and contacts the walls 3. The springs 8 may have these furrow 14 cut so as to increase the surface area contacting the side walls near the center of the walls 3 just as the biting surfaces 13 are increased to provide a longer cut into the side wall 3 near the corners 4. The furrow 14 provide support to the contacted walls of the tubular member 1.

The arms 9 define a biting surface or flat 13 of extended length for cutting into two separate walls 4 of each corner 4 in substantially the same amounts for each corner 4 formed in the tubing 1. The arms are notched to form an index corner 15. This notch 15 may also allow the spring to bend at this point.

Figure 7:
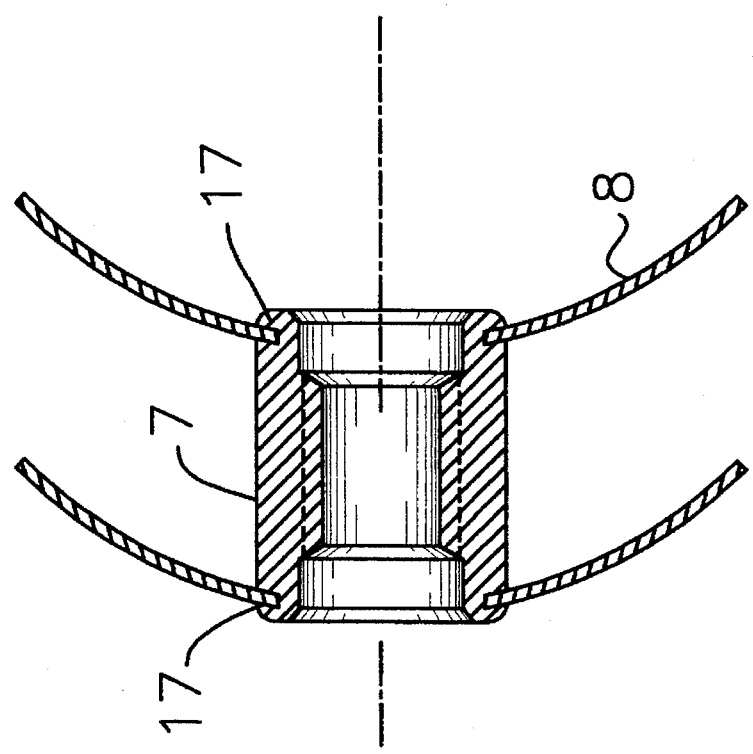
FIG. 7 is a cross sectional view of the spring of FIG. 1.

The springs 8 formed from stamped spring metal define a central opening for receiving a threaded member or bushing 5. Alternatively, the spring 8 may define a threaded circular opening where a bushing 5 is received. A boss 16 formed by the spring 8 serves to frictionally grip the bushing 5. A groove 17 shown in FIG. 7 in the bushing may serve to receive the spring 8.

In the preferred embodiment, at least one and preferably both of the stamped metal springs 8 defines four arms 9 and each of said four arms 9 are separated by 90 degrees to substantially form a cross so that the walls 3 near each corner 4 are contacted. As can be readily seen, the angle and number of arms 9 may vary so that triangular or other multi-sided tubing could be used without varying the underlying concept. Similarly, less than all of the corners 4 could be intersected although much of the effect of the improved gripping and reinforcing technology would be lost.

In such variations, the rounding of the arms 9 may vary as well as the exact shape and number of the furrow 14.

The furrow 14 are bevelled outward. The amount of curve and distance from the center of the spring 8 to the outside of the furrow 14 is such that at least a portion of the beveled furrow 14 bows outward to intercept part of the side 3 when the spring 8 is inserted and tensioned.

When the face or engaging means to is inserted at an angle of approximately 45 degrees to the walls 3 then the cut angle is approximately 45 degrees from the face 10 to form a flat 13 which fits approximately flatly against the tubular wall 3. The sharp edge 12 is at an angle of approximately 45 degrees from the walls of the tubular member the face is further defined by flats 13 cut at angles of approximately 45 degrees from the face so that the flats 13 contact the walls 3 of the tubular member. As can be seen by reference to FIG. 8, the edge 12 defines a curved surface so that the angle along the wall at the point of intersection is not exact.

Given the sharpening of the edges 12 it may also be noted that the furrow 14 may be sharpened so as to bite into the walls of the first tubular member.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

We claim:

1. A clamp for joining a first tubular member with a second member wherein the first tubular member defines at least two walls which meet in at least one corner comprising:

(a) at least one spring of spring steel defining at least one arm corresponding in number to the number of corners of the tubular member to be contacted;

(b) an engaging means on the end of at least one of said arms for contacting the at least two walls on either side of the corner;

(c) an attachment means for attaching the second member to the first tubular member.

2. The clamp of claim 1 wherein the engaging means further comprises an edge formed by the arm where the arm contacts the at least two walls.

3. The clamp of claim 2 wherein the engaging means further comprises at least one flat formed by an angular cut along the edge said cut reducing the size of the edge at an angle away from the edge to allow at least a portion of the flat to rest approximately flat against the face of the at least two walls of the corner when the spring is inserted into the tubular member.

4. The clamp of claim 3 wherein the edge of the spring is at an angle relative to the side walls when the spring is inserted and wherein the angular cut is at an additional angle so that the flat lies approximately flat against the walls of the tubular member.

5. The clamp of claim 4 wherein the at least two walls are at an angle of approximately 90 degrees and wherein the edge is inserted at an angle of approximately 45 degrees to the walls and the angular cut angle is approximately 45 degrees from the face so that the flat contacts the tubular walls.

6. The clamp of claim 3 wherein the arm further defines at least one notch reducing the diameter of the arm to allow for indexing as the spring is inserted into the first tubular member.

7. The clamp of claim 3 wherein the edge defines a curved surface.

8. The clamp of claim 3 wherein the flat is sharpened.

9. The clamp of claim 8 wherein the edge is sharpened.

10. The clamp of claim 2 wherein the area between the arms form a furrow which, when inserted into the tubular member, bow outwardly to contact the walls of the tubular member between the corners.

11. The clamp of claim 10 wherein the edges of the furrow are curved outward from the arms to bias the furrow to bow outward when the spring is inserted into the tubular member.

12. The clamp of claim 1 wherein the spring defines an opening and wherein the attachment means is further defined as a bushing having a threaded interior mounted though the opening defined by the spring so that a bolt from the second member may be inserted into the bushing and thereby secure the second member to the bushing.

13. The clamp of claim 12 wherein the spring further comprises at least 2 springs separated by having the springs attached to the central bushing at the predetermined distance by a boss means.

14. The clamp of claim 13 wherein the boss means further comprises a central cylinder in place around the bushing defining a platform of sufficient diameter to support the spring.

15. The clamp of claim 14 wherein the boss means further comprises a rivet on the opposite side of the spring from the bushing platform for securing the spring to the central cylinder platform.

16. The clamp of claim 1 wherein the tubular members comprise four walls and wherein the at least one arm comprise four separate arms and wherein each of said arms further comprises an engaging means.

17. The clamp of claim 10 wherein the spring further comprises a center and wherein the engaging means further comprises a plurality of arms extending outward from the furrow, said arms defining a spherical radius when the spring is inserted into the first tubular member.

18. The clamp of claim 17 wherein the spring further includes a plurality of arms that correspond in number to the number of corners defined by the first tubular member.

19. The clamp of claim 18 wherein at least one of the arms defines at least one notch for indexing when the spring is inserted into the first tubular member.

20. The clamp of claim 2 wherein the spring is of sufficient width between the arms so that the furrow between the arms contacts the walls when the spring is inserted so that the furrow adds support to the contacted walls.

21. The clamp of claim 20 wherein the furrow is sharpened so as to bite into the walls of the first tubular member.

22. A clamp for insertion into a tubular member having equally spaced corners comprising a spring and wherein said spring is formed from stamp metal defining a circular opening to receive a threaded bolt, said stamped metal spring comprising four arms and a furrow between the arms and wherein each of said four arms are separated by 90 degrees to substantially form a cross and wherein the ends of the arms are each cambered in order to maximize the intersection with the corners of the tubing.

23. The clamp of claim 22 wherein the spring arms further define at the point closes to the corners a face at a face at an angle of approximately 45 degrees from the walls of the tubular member and wherein the face is further defined by fiats cut at angles of approximately 45 degrees from the face so that the flats contact the walls of the tubular member.

24. The clamp of claim 23 wherein the furrow is beveled and the distance between the furrow is curved such that the furrow touches the wall of the tubular member when the spring is inserted.

* * * * *